H. H. CLOVER, dec'd.
CHARLES S. CLOVER, Adm'r.
HYDRANTS.
No. 7,243. Reissued July 25, 1876.
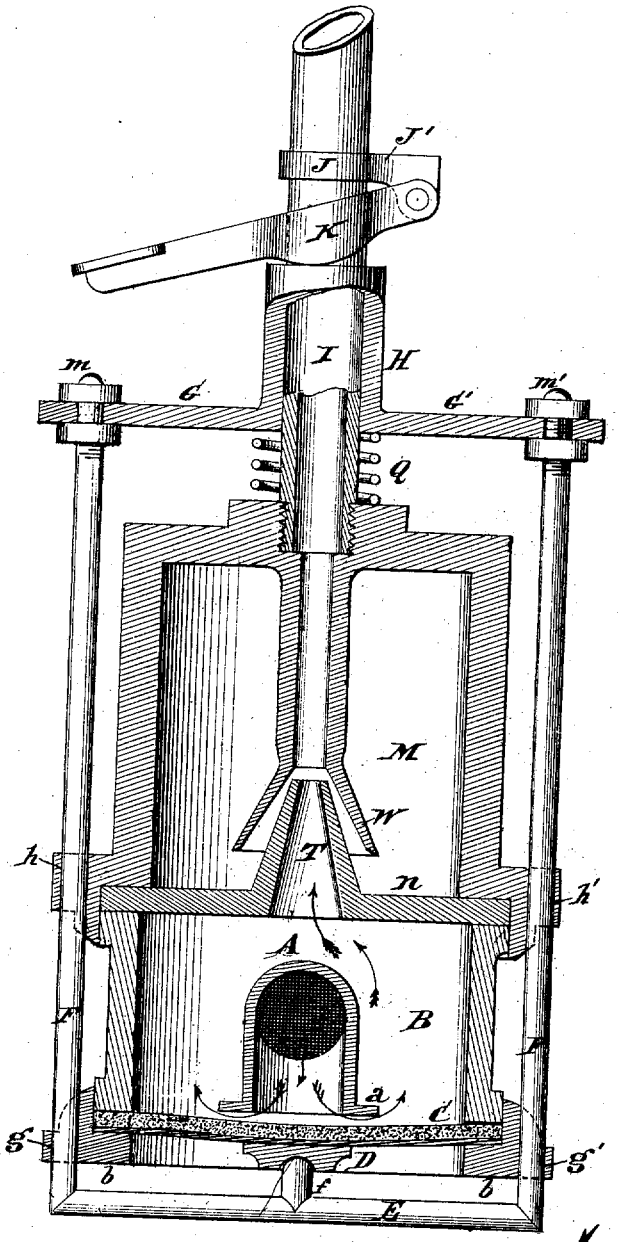
Witness
Edgar J. Gross
John J. Jones
Inventor
Charles S. Clover
Administrator of the estate of
Harvey H. Clover deceased
By F. Millward
Atty
N. PETERS, PHOTO-LITHOGRAPHER, WASHINGTON, D. C.

UNITED STATES PATENT OFFICE.

CHARLES S. CLOVER, ADMINISTRATOR, OF BAY CITY, MICHIGAN, AND JOSEPH H. STREHLI AND JAMES KIERAN, OF CINCINNATI, OHIO, ASSIGNEES, BY MESNE ASSIGNMENTS, OF ONE-HALF INTEREST OF HARVEY H. CLOVER, DECEASED.

IMPROVEMENT IN HYDRANTS.

Specification forming part of Letters Patent No. 162,351, dated April 20, 1875; reissue No. 7,243, dated July 25, 1876; application filed May 13, 1876.

*To all whom it may concern:*

Be it known that HARVEY H. CLOVER, deceased, of Cincinnati, in the county of Hamilton and State of Ohio, did invent a new and useful Improvement in Hydrants, which improvement is fully set forth by me, CHARLES S. CLOVER, his aforesaid administrator, in the following specification, reference being had to the accompanying drawings.

The invention is primarily divisible into two parts. The object of the first part of the invention is to prevent the freezing of the hydrant, and this is attained by the provision, in connection with the stock or hydrant-pipe, of an ejector and fluid-chamber in communication therewith, the operation being such that, when the hydrant is open, the ejector will draw the air or water, or both, from the fluid-chamber and eject the same into the hydrant-pipe, thus causing a vacuum in the fluid-chamber, which will cause the water in the hydrant-pipe, when the hydrant is closed, to flow rapidly back into the fluid-chamber, and leave the rising pipe empty. The object of the second part of the invention is to prevent waste of water. To effect this, a peculiar device is employed, which automatically cuts off the supply of water to the hydrant whenever no more water is wanted. This device consists of a flexible diaphragmic valve, so arranged that pressure exerted upon a lever or treadle by the operator through intermediate devices opens the valve, and when the operator withdraws his pressure, the valve will, by means of a spring, close and stop the flow of water.

In the accompanying drawing, the figure represents a vertical middle section of a hydrant embodying the improvements, and taken transversely to the inlet-pipe.

A designates the inlet-pipe, which supplies the hydrant with water from the main or reservoir. After entering the chamber B, designed to first receive the water from the inlet-pipe, the latter descends vertically, and terminates in a valve-seat, *a*, against which presses the face of the flexible diaphragmic valve C. The latter is here preferably of a diameter exceeding that of the chamber B, and its edge is placed under the lower edge of the wall of this chamber. The ring *b* is secured to the water-chamber by any of the usual methods—as by bolts, screws, &c. A piece of packing or facing, *e*, of any suitable material, of the same diameter as the diaphragm, is placed against the latter, and between it and the mouth of the inlet-pipe, and is preferably secured in the same way as the valve. A disk, D, of sufficient size to properly raise the diaphragmic valve against the mouth of the inlet-pipe, so that the packing of the valve will at once firmly impinge against every part of the edge of the said mouth, is placed under the valve, and rests upon a rounded stub or pin, *f*. The latter is attached to the middle of the lower piece E of the yoke-frame. This yoke-frame is preferably constructed as follows: To each end of the cross-piece E is attached a vertical rod, F. These rods slide in guideways *g g'*, projecting from the side of chamber B, and in guideways *h h'*, projecting from the side of vacuum-chamber M. Arms G G' attached to the tube H, sliding on the discharge-pipe I, secure the rods F F in position, each arm being secured to its respective rod by the set-screws *m m'*.

The tube H is usually of greater length proportionally to the hydrant than shown in the drawing, and is always sufficiently long to reach from the hydrant to the surface of the ground. Immediately beneath this tube a spiral spring, Q, coiled around the discharge-pipe I, serves to keep the frame E F G G' elevated, and the diaphragmic valve tightly pressed against the mouth of the inlet-pipe. Immediately above the terminus of the sliding tube is a collar, J, inclosing the discharge-pipe I, and provided with arms J'. At the end of the latter is fulcrumed a treadle, K. The fulcrum-point of the latter is, for the sake of compactness, placed on one side of the discharge-tube, and the lever-plate is placed on the other. The lever near its middle touches the top of the tube H. M designates the vacuum-chamber, here placed directly above the water-chamber B, and separated from the latter by the partition *n*. Chamber M is preferably made larger than chamber B. From the chamber B a nozzle, T, extends into the vacuum-chamber M, and a reception-mouth, W, is arranged to receive both the water from the nozzle T and the chamber M, the nozzle and mouth constituting an ejector, whose object is to draw the water or air from the chamber M into the general current up the hydrant-pipe, for the purpose of producing a vacuum or partial vacuum in chamber M.

The mode of operation of the hydrant remains to be described. The operator who wishes to draw water from the hydrant presses down the lever, thus pressing frame E F G G′, compressing spring Q, and lowering stud *f* away from the diaphragmic valve. The latter will then yield to the pressure of the water in the inlet-pipe A and permit the water to enter the water-chamber B. After the latter is filled with water, the water ascends through the conical nozzle T, which, from its shape, causes the movement of the water to be accelerated through it. The rapid motion sucks the air out of the vacuum-chamber and causes a vacuum therein. The water passes up through the discharge-pipe I and out of the discharge-orifice of the hydrant. When sufficient water has been drawn, the operator relieves the lever K of pressure, whereupon the spring Q raises frame E F G G′ and stub *f*, and thus presses the diaphragmic valve C closely against the mouth of the inlet-pipe, thereby cutting off the flow of water from the inlet-pipe into chamber B. The movement of the water through the conical nozzle T is thus checked, and thereupon the vacuum existing in chamber M will cause the water to flow down through the discharge-pipe and into the chamber M, thereby emptying of water all that portion of the discharge-pipe which is above the top of the vacuum-chamber. The hydrant will thus remain in this condition until water is again drawn therefrom; and this condition is its usual one when water is not being drawn.

It may here be remarked that the vacuum-chamber is to be placed so far below the surface of the ground that frost cannot reach it. Then, when the water formerly in the discharge-pipe is drawn into the vacuum-chamber, of course it is safe from the effects of frost, and cannot possibly freeze. When the operator draws a second time from the hydrant, again pressing the lever, the water ascends, and, passing through the conical orifice T, acquires sufficient velocity to draw the water in the vacuum-chamber into the mouth W and the discharge-pipe, leaving a vacuum in the vacuum-chamber. The shape of this mouth W is such as to accelerate the velocity of the water passing out through it. When the pressure upon the lever ceases the water in the discharge-pipe again flows into the vacuum-chamber. Thus this latter chamber is emptied and filled with fresh water from the discharge-pipe every time the water is drawn from the hydrant. All danger of the water in the vacuum-chamber becoming impure is thereby avoided. By means of the vacuum-chamber and the ejector T W the bursting of hydrants and the stoppage of water by the freezing of the water therein is prevented—two very important desideratums in cities and localities where the mercury in the thermometer often falls below the freezing-point during the winter.

To prevent hydrants from freezing it is quite common to clear the discharge-pipe of the hydrant by allowing the water therein to flow into the ground, thereby wasting water and making wet cellars. This invention prevents this waste and keeps the cellar dry.

The method of shutting off the supply of water to the hydrant by means of the diaphragmic valve and its accompanying devices is automatic, sure, and reliable. It relieves the operator from any necessity of closing the valve and prevents the discharge of more water than he intentionally draws.

This improvement is of great value in cities and localities where the supply of water is limited and the saving of the latter becomes a necessity or an advantage.

The diaphragmic valve is also applicable to those styles of hydrants which dispense with the use of a vacuum-chamber or a receiving-chamber, B, and is then equally useful in preventing waste of water. The vacuum-chamber may be used to advantage without the diaphragmic valve C, in which case the inlet-pipe might connect with nozzle T through the intervention of a common valve employed to regulate the supply of water to the hydrant.

What I claim as new, and desire to secure by Letters Patent, is—

1. A hydrant having in combination a valve-governed supply-pipe, a vacuum-chamber, an ejector to create the vacuum, and a discharge-pipe, substantially as and for the purpose specified.

2. The combination of the inlet-pipe A, flexible diaphragmic valve C, disk D, frame *f* E F F′ G G′ H, spring Q, lever K, water-chamber B, and a discharge-pipe I, for the purpose mentioned.

3. The combination of the flexible diaphragmic valve C, combined with mechanism whereby it will cut off the supply of water to the hydrant, inlet-pipe A, chamber B, ejector T W, chamber M, and discharge-pipe I, substantially as and for the purposes set forth.

In testimony of which invention I hereunto set my hand.

CHARLES S. CLOVER, *Admr.*

Witnesses:

JNO. MCMASTER,
GEORGE P. COBB.